April 28, 1970   W. D. NIEGISCH ET AL   3,509,075
POLYMERIZATION PROCESS AND PRODUCT THEREOF
Filed May 4, 1966

INVENTORS
WALTER D. NIEGISCH
BY WILLIAM E. LOEB

ATTORNEY

United States Patent Office 3,509,075
Patented Apr. 28, 1970

3,509,075
POLYMERIZATION PROCESS AND PRODUCT THEREOF
Walter D. Niegisch, Watchung, and William E. Loeb, Martinsville, N.J., assignors to Union Carbide Corporation, a corporation of New York
Filed May 4, 1966, Ser. No. 548,821
Int. Cl. C08g 33/00
U.S. Cl. 260—2
9 Claims

ABSTRACT OF THE DISCLOSURE

A process for preparing highly extensible poly-p-xylylenes at high deposition rates through the condensation of p-xylylene diradicals at pressures below 75 mm. Hg and at temperatures between about 0° C. and —196° C.

---

Figure 1:
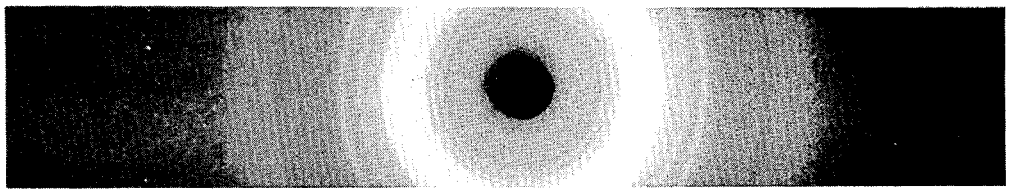

This invention relates to a process for the preparation of p-xylylene polymers exhibiting prolonged high extensibility and to a crystalline polymorph produced thereby.

It is known that various poly-p-xylylenes can be prepared by a pyrolytic polymerization of p-xylene and substituted derivatives thereof. This process, first disclosed by M. Szwarc, Disc. Faraday Society, 2 46 (1947), termed the Szwarc process, basically consists of a high temperature pyrolysis (800–1000° C. at subatmospheric pressures) of the starting p-xylene followed by cooling the pyrolysis vapors to a polymerization temperature, such as by condensing the vapors on a substrate at about room temperature. Upon cooling and condensation, the reactive diradical formed in the pyrolysis instantly polymerizes and forms a polymeric film on the substrate. However, the high operating temperature of this process and the exceptionally low yield of polymer (about 10–12 percent of theoretical) left much to be desired for commercial applications.

For instance, in the Szwarc process, operating temperatures of 800° C.–1000° C. were found to cleave off hydrogen or other substituent groups in the para-xylene because of the instability of such substituent groups at such temperatures resulting in the formation of cross-linked polymers. Thus, such a procedure is unsuitable for the preparation of linear para-xylylene polymers.

In addition, these high operating temperatures, even with unsubstituted para-xylene, were found to char the polymer to such an extent that off-color, undesirable polymers resulted. With substituted polymers, charring became so severe that it could not be tolerated.

Thus, the polymer of the Szwarc process has been found to be of such non-uniform quality and so generally cross-linked and insoluble in low-boiling solvents as to limit its use even when of acceptable quality. Such polymers are generally only soluble with difficulty in certain few high boiling solvents.

Kaufman, Mark & Mesrobian (J. Pol. Sci., 13 (1954)), investigating the polymer, concluded that the polymer was extensively cross-linked and was not the linear polymer that Szwarc presumed it to be. They also observed that after 48 hours, the Szwarc polymer was brittle at room temperature although it could be stretched 250–400 percent at temperatures above 150° C. Hence, the Szwarc polymer is further limited in commercial application since the polymer embrittles after a short period of time and does not exhibit useful extensibility.

W. F. Gorham in copending application Ser. No. 528,413 filed Feb. 18, 1966, now U.S. Patent No. 3,342,754, granted Sept. 19, 1967, describes the preparation of truly linear p-xylylene polymers produced in nearly quantitative yields by heating a cyclo di-p-xylylene having up to about 6 aromatic nuclear substituent groups to a temperature between about 450° C. and 700° C. for a time sufficient to cleave substantially all of the di-p-xylylene into vaporous p-xylylene diradicals but insufficient to further degrade the said diradicals and at a pressure such that the partial pressure of the vaporous p-xylylene diradicals is below 1.0 mm. Hg and preferably below 0.75 mm. Hg, and cooling the vaporous diradicals to a temperature below 200° C. and below the ceiling condensation temperature of the p-xylylene diradical species present in the pyrolysis vapors. Condensation of the diradicals yields tough, linear, non-fluorescent p-xylylene polymers. All known p-xylylene diradical species have condensation temperatures below about 200° C. and above or about room temperature. Typically, the extensibility of the Gorham polymers at room temperature has been found to be about 10–15 percent.

It is an object of the present invention to provide a process whereby linear p-xylylene polymers are produced exhibiting high extensibilities enabling their use as an encapsulant capable of compensating for the thermal expansion or change of state of an encapsulated material.

It is another object of the present invention to provide a process whereby linear p-xylylene polymers are produced at high growth rates exhibiting increased tensile strength, elongation at break and yield elongation.

It is still another object of the present invention to provide a novel, crystalline polymorph of poly-p-xylylene.

These and other objects are accomplished by the present invention which provides, in one aspect thereof, a process for the preparation of poly-p-xylylene exhibiting high extensibility which comprises pyrolyzing cyclic di-p-xylylene having the structural formula:

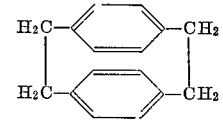

at a temperature between about 450° C. and 700° C. for a time sufficient to cleave substantially all of the di-p-xylylene into p-xylylene diradicals but insufficient to degrade said diradicals and at a pressure such that the partial pressure of the p-xylylene diradicals is below about 0.75 mm. Hg, and cooling the diradicals to a temperature between about 0° C. and —196° C. thereby condensing said diradicals and forming a highly extensible poly-p-xylylene.

In another aspect of the present invention, the poly-p-xylylene produced by the process of the present invention contains a heretofore unknown polymorph referred to herein as the gamma (γ) modification of poly-p-xylylene.

Figure 2:
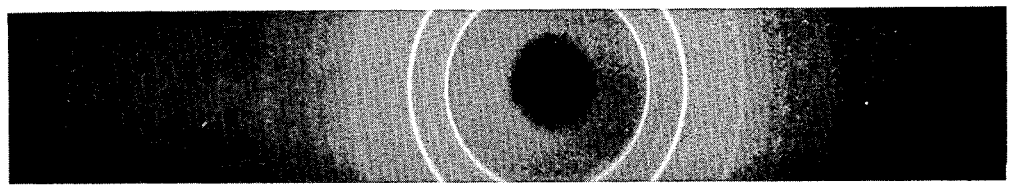
Figure 3:
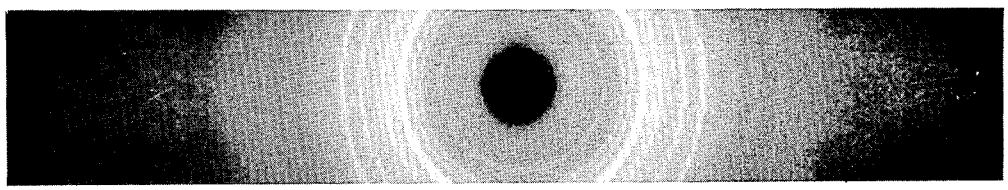

In order to provide a more comprehensive understanding of the present invention, typical X-ray diffraction patterns of the various polymorphs of poly-p-xylylene are shown in the accompanying drawing wherein:

FIGURE 1 presents the X-ray diffraction pattern of the novel gamma (γ) polymorph of poly-p-xylylene;
FIGURE 2 presents the X-ray diffraction pattern of the known alpha (α) polymorph of poly-p-xylylene; and FIGURE 3 presents the X-ray diffraction pattern of the known beta (β) polymorph of poly-p-xylylene.

In the process of the present invention, p-xylylene diradicals are prepared by the pyrolytic cleavage of cyclic di-p-xylylene represented by the structural formula:

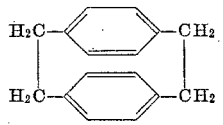

Pyrolytic cleavage of the cylic dimer results in the splitting of the dimer into two reactive diradicals, each of which are represented by the basic structure:

The reactive diradicals are prepared by pyrolyzing di-para-xylylene at a temperature less than about 700° C., and preferably at a temperature between about 550° C. to about 600° C. At such temperatures, essentially quantitative yields of the reactive diradical are secured. Pyrolysis of the starting di-p-xylylene begins at about 450° C. regardless of the pressure employed. Operation in the range of 450°–550° C. serves only to increase time of reaction and lessen the yield of polymer secured. At temperatures above about 700° C., cleavage of the substituent group can occur, resulting in a tri- or poly-functional species causing cross-linking of highly branched polymers.

Pyrolysis temperature is nearly independent of the system operating pressure. It is, however, preferred that reduced or subatmospheric system pressures be employed. For most operations, system pressure within the range of 0.0001 to 10 mm. Hg is most practical. However, if desired, greater pressures can be employed by using inert vaporous diluents such as nitrogen, argon, carbon dioxide, steam and the like which can either vary the optimum temperature of operation or change the total effective pressure in the system. In fact, essentially quantitative yields of clear, tough linear poly-p-xylylene is secured at system pressures up to atmospheric as long as the diradical partial pressure is maintained below 1.0 mm. pressure.

Heretofore, p-xylylene diradicals have been polymerized by maintaining the polymerization zone at a temperature below the ceiling condensation temperatures of the diradical species involved. All observed ceiling condensation temperatures have been between about room temperature, i.e., 25° C. and 200° C. but vary to some degree upon the operating pressure involved. For example, at 0.5 mm. Hg pressure, the following condensation and polymerization ceilings have been observed for the following diradicals:

| | ° C. |
|---|---|
| p-Xylylene | 25– 30 |
| Chloro-p-xylylene | 70– 80 |
| n-Butyl-p-xylylene | 130–140 |
| Carbomethoxy-p-xylylene | 130–140 |
| Dichloro-p-xylylene | 130–140 |

Thus, p-xylylene polymers have been made by cooling the vaporous diradicals to a temperature at or just below the condensation temperature of the particular diradical species involved. P-xylylene polymers formed in this manner have been found to exhibit extensibilities at room temperature of from about 10–15 percent.

It has now been found that cooling the vaporous diradicals, regardless of ceiling condensation temperature considerations, to temperatures of from 0° C. to about —196° C. results in p-xylylene polymers exhibiting unexpectedly high extensibilities at room temperature. In general, the p-xylylene polymers produced by the present invention have exhibited extensibilities in excess of about 100 percent which are substantially unaffected by aging of the polymer. Preferably, the vaporous diradicals are cooled to temperatures of from about —20° C. to about —50° C. At temperatures above about 0° C., the extensibility of the polymer rapidly diminishes to that heretofore obtained, i.e., 10–15 percent. At temperatures below about —196° C., coherent films can be deposited but the deposition rate is too slow to be considered practical.

Polymer quality is dependent on diradical partial pressure in the condensation zone. Deposition at or above 1.0 mm. partial pressure has been found to yield yellow, highly fluorescent polymers with impaired physical properties containing stilbene moieties and/or substantial cross-linking. As the partial pressure is reduced below 1.0 mm., polymer quality as measured by color, transparency and fluorescence is remarkably improved. At a pressure of 0.75 mm. the polymer is free of fluorescence and acceptable in quality although slightly yellow whereas at a pressure of 0.5 mm. or less the quality is excellent with no color or fluorescence, and is strong and flexible.

Unexpectedly, it has now been found that there is a partial pressure range within which the p-xylylene polymers attain optimum extensibility. Thus, when the p-xylylene diradicals are condensed and polymerized at temperatures between about 0° C. and —196° C. and at p-xylylene partial pressure up to about 300 microns, optimum extensibility is attained. In this manner, poly-p-xylylenes have been obtained exhibiting extensibilities, i.e., ultimate elongations, as high as 300 percent. At p-xylylene partial pressures below about 20 microns, the deposition rate is too slow to economically obtain thick films; however, even, when thin films are desired, elongation is apparently reduced. At p-xylylene partial pressures above about 300 microns, the extensibility of the resulting polymer rapidly falls below about 100 percent. Preferably, p-xylylene partial pressure of from about 200 to 300 microns is employed.

Formation of poly-p-xylylene is greatly enhanced by operation in accordance with the preferred aspects of the present invention. It has been found that the growth rate of poly-p-xylylene, i.e., the increase in film thickness per minute, varies directly with the square of the p-xylylene partial pressure, up to pressures of about 300 microns. Additionally, at constant pressure, the growth rate increases with decreasing substrate temperature. Thus, by depositing p-xylylene diradicals at temperatures below 0° C. and preferably at from about —20° C. to about —50° C. and at p-xylylene partial pressure up to about 300 microns, up to about 40-fold increases in growth rate as compared to prior deposition methods have been obtained.

Because of the pressure sensitivity involved, common U-tube mercury manometers, which are virtually impossible to read with accuracy below 1.0 mm. are recommended only for indicating system pressure. Even though the diradical is a condensible gas, thermocouple gauges for measuring the partial pressures can be used and are recommended, if heated to prevent deposition of polymer on the filaments. Preferably, though not always necessary, the heated thermocouple gauge can be calibrated against a McCleod gauge to relate the true partial pressure of the p-xylene diradicals.

It has also been found that annealing the resulting polymers in vacuum at temperatures of from about 100° C. to 300° C. results in a surprising increase in yield elongation as opposed to the generally expected decrease in yield elongation due to an increase in crystallinity with annealing. The unannealed polymers exhibit a yield elongation of about 2–3 percent; whereas the annealed polymers exhibit yield elongation of about 10 percent. Thus, through the present invention, especially tough poly-p-xylylene exhibiting increased tensile strength, ultimate elongation and yield elongation are obtained by depositing the p-xylylene diradicals at temperatures of from about 0° to —196° C. at p-xylylene partial pressures below about 300 microns followed by a vacuum annealing treatment. The annealing treatment, however, is not considered necessary in obtaining the highly extensible polymers of the present invention and can be omitted, if desired.

In another aspect of the present invention, a novel polymorph of poly-p-xylylene has been found to exist when p-xylylene diradicals are deposited at temperatures below about −20° C. Poly-p-xylylene having the repeating unit:

is unique within the p-xylylene polymer family in that it exhibits polymorphism. Two polymorphs have heretofore been known to exist. The alpha ($\alpha$) modification is metastable and transforms to the stable beta ($\beta$) modification at temperatures above 220° C. An additional transition has now been observed at 270° C., which is reversible. On the basis of X-ray and optical evidence, the 270° C. transition is considered to be a smectic mesomorph of the beta modification, similar to the analogous transition of poly(tetrafluoroethylene) at 29° C.

It has now been found that at temperatures below about −20° C., a new polymorph of poly-p-xylylene referred to herein as the gamma ($\gamma$) modification is formed. At temperatures between about −20° C. and −50° C., the alpha ($\alpha$) and gamma ($\gamma$) modifications are codeposited. The relative amounts formed are dependent upon the temperature with slower deposition rates favoring the formation of the more stable alpha modification. The gamma ($\gamma$) modification is the only polymorph formed at substrate deposition temperatures below −50° C. The gamma modification is metastable and is transformed to the alpha modification at temperatures above about 80° C. Lattice constants have not been determined for the gamma polymorph due to the somewhat diffuse nature of the reflections and the fact that fiber diagrams of uniaxially oriented $\gamma$ poly-p-xylylene correspond to the $\alpha$-modification after orientation. The gamma modification can, however, be identified and distinguished from the alpha and beta polymorphs by a comparison of the interplanar spacings determined from the X-ray powder diffraction patterns for the respective polymorphs. Reference is made to the drawing wherein FIGURE 1 represents the X-ray powder diffraction pattern of the gamma ($\gamma$) polymorph. In comparison FIGURE 2 represents the X-ray powder diffraction pattern of the alpha ($\alpha$) polymorph and FIGURE 3, the X-ray powder diffraction pattern of the beta ($\beta$) polymorph. In Table I, below, the interplanar spacing and the relative intensity of the X-ray powder diffraction patterns of the respective polymorphs are compared. The data was obtained with a 114.6 mm. Philips powder camera; nickel filtered copper $K_\alpha$ radiation; KV/ma=40/20.

TABLE I

| Alpha | | Beta | | Gamma | |
|---|---|---|---|---|---|
| I | d (A.) | I | d (A.) | I | d (A.) |
|  |  |  |  | VW | 7.79 |
|  |  | M | 6.59 | M | 6.59 |
|  |  |  |  | M | 5.97 |
| VS | 5.31 | M | 5.31 |  |  |
|  |  |  |  | M | 5.21 |
| W | 5.01 | M | 4.94 | MW | 4.97 |
|  |  |  |  | W | 4.68 |
| W | 4.45 | VS | 4.43 | VS | 4.45 |
|  |  |  |  | W | 4.18 |
|  |  | W | 4.05 |  |  |
| VS | 3.91 | M | 3.88 | M | 3.90 |
|  |  | W | 3.66 | VW | 3.69 |
| VW | 3.51 |  |  | VW | 3.53 |
|  |  | M | 3.33 | M | 3.32 |
|  |  |  |  | M | 2.98 |
| VW | 3.00 | M | 3.00 | M | 2.53 |
| M | 2.47 | W | 2.52 | W | 2.35 |
| VW | 2.31 | W | 2.35 | W | 2.18 |
| VW | 2.19 | W | 2.18 | W | 2.13 |
| VW | 2.10 | MW | 2.13 |  |  |

I=Relative intensity; d=Interplanar spacing in Angstrom units; S=Strong; M=Medium; W=Weak; V=Very.

The p-xylylene polymers of the present invention are readily recovered from the condensation polymerization zone by any convenient means, depending upon the particular zone employed. Where a surface maintained at temperatures of from 0° C. to about −196° C. such as a condenser or trapping device is employed as the polymerization zone, the polymer can be removed from the wall of the zone by mechanically stripping it off or other similar means. It is not to be implied that the polymers of this invention have to be removed or recovered from the depositing surface since the most practical of all applications is to have the surface or substrate to be coated and protected within or as a part of the polymerization zone. Small articles can be protected or encapsulated with these polymers or planar or irregular substrates of any sort can be coated, with or without masking, for securing the insulative and protective properties of the poly-p-xylylene of this invention. Deposition of the polymer on continuously moving surfaces of paper, metal foils, fabrics and the like can readily be accomplished within the deposition zone by appropriate design. In particular, the highly extensible p-xylylene polymers of the present invention are particularly useful where the encapsulated substrate undergoes changes in density or shape as its environment changes. For example, ice was encapsulated with highly extensible poly-p-xylylene by condensing and polymerizing p-xylylene diradicals in a tumbling deposition zone maintained at temperatures below 0° C. The ice particles were maintained in constant motion thereby continually exposing fresh surfaces to be coated. After encapsulation, the ice particles were allowed to warm to room temperature and melt. The high extensibility of the poly-p-xylylene encapsulant enabled the encapsulation to closely conform to the change in the shape of the substrate occasioned by its transformation from solid ice to liquid water.

The following examples are illustrative of the present invention and should not be interpreted as a limitation thereof. Unless otherwise noted, all parts and percentages are by weight.

EXAMPLES 1–9

Cyclic di-p-xylylene prepared in the manner described by Pollart in U.S. 3,149,175, was placed within a borosilicate glass sublimation chamber measuring 2 inches in diameter and 4 inches long. A thermocouple gauge registered the pressure at one end of the chamber, the other end of said chamber was connected by a standard taper joint to a 1⅜ inch diameter quartz pyrolysis tube 26 inches long. The cyclic dimer was sublimed at an outside temperature of 135° C. and a system pressure of about 0.2 mm. Hg. The vapors passed through a 6 inch section of the pyrolysis tube (vaporization zone) heated to 200° C. and then a 19 inch length (pyrolysis zone) maintained at temperatures between about 550° C.–600° C. The polymerization chamber was connected to the terminal portion of the pyrolysis tube and was maintained at various temperatures below 0° C. by immersion of the polymerization chamber in a Dry Ice-acetone mixture contained in a Dewar flask. In order to prevent the Dry Ice from directly contacting the polymerization chamber, an aluminum shield was placed in the Dewar flask dividing it into two annular compartments, one containing the polymerization chamber immersed in acetone and the other containing the Dry Ice-acetone mixture. Dry Ice was added periodically to the outer zone to maintain a constant temperature in the inner zone which directly cooled the polymerization chamber. The polymer was recovered by stripping it from the walls of the polymerization chamber.

In examples wherein the polymer was annealed, the polymerization chamber was heated to the annealing temperature and the deposited film was maintained at the annealing temperature, under vacuum for from about 3 to 6 hours and thereafter allowed to cool to room temperature.

Control samples were prepared in the same manner as described above except that the polymerization chamber was maintained at room temperature.

The room temperature tensile properties of poly-p-xylylene prepared in accordance with the present invention are shown in Table II.

TABLE II

| Example | Substrate Temperature (° C.) | p-Xylylene partial pressure (microns) | Vacuum annealing conditions | Tensile Strength (p.s.i.) | Elongation at break (Percent) | Tensile modulus (p.s.i.) |
|---|---|---|---|---|---|---|
| Control | +25 | 200 | | 7,000 | 13 | 330,000 |
| 1 | −25 | 50 | | 7,900 | 233 | 371,800 |
| 2 | −25 | 95 | | 8,000 | 213 | 344,000 |
| 3 | −25 | 100 | | 8,600 | 196 | 317,000 |
| 4 | −25 | 300 | 150° C. for 3 hours | 10,000 | 28 | 359,000 |
| Control | +25 | 100 | do | 4,900 | 10 | 265,000 |
| 5 | −25 | 200 | do | 10,600 | 177 | 346,000 |
| 6 | −25 | 250 | do | 10,700 | 213 | 328,000 |
| 7 | −30 | 155 | do | 12,300 | 178 | 464,000 |
| 8 | −35 | 155 | do | 11,100 | 165 | 384,000 |
| 9 | −35 | 37 | do | 9,500 | 37 | 367,000 |

It can readily be seen that when the polymerization temperature is maintained below 0° C., a marked increase in elongation at break is obtained. Also, as the extremities of the preferred p-xylylene partial pressure range are approached, a rapid decline in elongation can be observed.

EXAMPLES 10–24

In the same manner as described in Examples 1–9, di-p-xylylene was pyrolyzed and deposited at temperatures below 0° C. to form poly-p-xylylene exhibiting increased extensibility. In Table III below, the effect of annealing on the yield elongation is demonstrated. It can be seen that annealing of the control samples (prepared by deposition at room temperature) had no appreciable effect on yield elongation; whereas, annealing of the poly-p-xylylene films prepared by low temperature deposition resulted in yield elongation as high as 15 percent.

TABLE III

| Example | Polymerization Anneal Temp./Temp., °C.[1] | Modulus×10⁻³, p.s.i. | | | Yield Strength, p.s.i. | | | Tensile Strength, p.s.i. | | | Yield Elongation, Percent | | | Ultimate Elongation, Percent | | |
|---|---|---|---|---|---|---|---|---|---|---|---|---|---|---|---|---|
| | | RT[2] | 150 | 250 | RT | 150 | 250 | RT | 150 | 250 | RT | 150 | 250 | RT | 150 | 250 |
| 10 | −20/RT | 360 | | | 5,300 | | | 6,000 | | | 2.5 | | | 170 | | |
| 11 | −20/150 | | 310 | | | 6,600 | | | | | | | | | 13 | |
| 12 | −20/250 | | | 270 | | | 7,800 | | | 7,800 | | | 15 | | | 19 |
| 13 | −20/RT | 370 | | | 6,100 | | | 7,000 | | | 2.5 | | | 240 | | |
| 14 | −20/150 | | 360 | | | 8,900 | | | 8,900 | | | 10 | | | 108 | |
| 15 | −20/250 | | | 330 | | | 9,600 | | | 9,600 | | | 6 | | | 8 |
| 16 | −25/RT | 370 | | | 6,200 | | | 8,600 | | | 2.5 | | | 240 | | |
| 17 | −25/150 | | 330 | | | 7,900 | | | 7,900 | | | 8.5 | | | 15 | |
| 18 | −25/250 | | | 310 | | | 9,500 | | | 9,500 | | | 12 | | | 16 |
| 19 | −35/RT | 275 | | | 4,500 | | | 6,000 | | | 2.5 | | | 170 | | |
| 20 | −35/150 | | 265 | | | 6,300 | | | 6,300 | | | 11 | | | 19 | |
| 21 | −35/250 | | | 205 | | | 6,000 | | | 6,000 | | | | | | 8 |
| 22 | −40/RT | 280 | | | 4,800 | | | 5,000 | | | 2.5 | | | 177 | | |
| 23 | −40/150 | | 300 | | | | | | 7,700 | | | | | | 15 | |
| 24 | −40/250 | | | 300 | | | 8,500 | | | 8,500 | | | 11 | | | 22 |
| Control | +25/RT | 313 | | | 5,800 | | | | | | 3.0 | | | 5.5 | | |
| Do | +25/150 | | | | | | | | | | | 2.5 | | | 7 | |
| Do | +25/250 | | | | | | | | | | | | | | | 3 |

[1] 150° C.=6 hrs., 250° C.=3 hr. anneal.
[2] RT=Room Temperature=25° C.

EXAMPLE 25

In the same manner described in Examples 1–9, di-p-xylylene was pyrolyzed and polymerized by condensation in a polymerization chamber immersed in liquid nitrogen at a temperature of −192° C. The poly-p-xylylene film was deposited at the rate of 200 angstroms per minute. The resulting film was coherent and contained a significant amount of crystallinity. Transmission electron diffraction pattern studies of the polymer deposited at −192° C. clearly establishes that at this temperature, only the gamma ($\gamma$) modification is formed. Annealing the film at 190° C. for several hours caused a transformation to the alpha ($\alpha$) modification. Annealing at 265° C. effects transformation to the beta ($\beta$) modification.

What is claimed is:

1. Process for the preparation of poly-p-xylylene exhibiting high extensibility which comprises pyrolyzing cyclic di-p-xylylene having the structural formula:

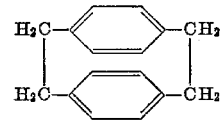

at a temperature between about 450° C. and 700° C. for a time sufficient to cleave substantially all of the di-p-xylylene into p-xylylene diradicals but insufficient to degrade said diradicals and at a pressure such that the partial pressure of the p-xylylene diradicals is below about 0.75 mm. Hg, and cooling the diradicals to a temperature between about 0° C. and −50° C. thereby condensing said diradicals and forming a highly extensible poly-p-xylylene.

2. Process as defined in claim 1 wherein the diradicals are cooled and condensed at temperatures between about −20° C. to about −50° C.

3. Process as defined in claim 1 wherein the p-xylylene partial pressure ranges up to about 300 microns.

4. Process as defined in claim 3 wherein the p-xylylene partial pressure is from about 200 to 300 microns.

5. Process as defined in claim 1 wherein the resulting poly-p-xylylene is vacuum annealed at temperatures of from about 100° C. to 300° C.

6. Process for the preparation of poly-p-xylylene at high growth rates exhibiting high extensibility which comprises pyrolyzing cyclic di-p-xylylene having the structural formula:

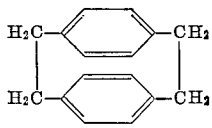

at a temperature between about 450° C. and 700° C. for a time sufficient to cleave substantially all of the di-p-xylylene into p-xylylene diradicals but insufficient to degrade said diradicals and at a pressure such that the partial pressure of the p-xylylene diradicals ranges up to about 300 microns, and cooling the diradicals to a temperature between about 0° C. and −50° C. thereby rapidly condensing said diradicals and forming a highly extensible poly-p-xylylene.

7. Process as defined in claim 6 wherein the diradicals are cooled and condensed at temperatures between about −20° C. to about −50° C.

8. Process as defined in claim 6 wherein the p-xylylene partial pressure is from about 200 to 300 microns.

9. Process as defined in claim 6 wherein the resulting poly-p-xylylene is vacuum annealed at temperatures of from about 100° C. to 300° C.

References Cited

UNITED STATES PATENTS

| 2,999,820 | 9/1961 | Young | 260—2 |
| 3,084,146 | 4/1963 | Errede | 260—2 |
| 3,342,754 | 9/1967 | Gorham | 260—2 |

OTHER REFERENCES

Kaufman et al., "Jour. of Polymer Science," vol. XIII (1954), pp. 3–20, pp. 3–11 only needed.

Auspos et al., "Journal of Polymer Science," vol. XV (1955), pp. 19–29.

SAMUEL H. BLECH, Primary Examiner

U.S. Cl. X.R.

117—106, 161; 264—346